M. L. HOYT.
CENTRIFUGAL LIQUID SEPARATOR.
APPLICATION FILED JUNE 19, 1908.

950,331.

Patented Feb. 22, 1910.

Witnesses:

Inventor.
Matthew L. Hoyt,
By Wilhelm, Parker & Hard,
Attorneys.

UNITED STATES PATENT OFFICE.

MATTHEW L. HOYT, OF LITTLE FALLS, NEW YORK, ASSIGNOR TO D. H. BURRELL & CO., OF LITTLE FALLS, NEW YORK.

CENTRIFUGAL LIQUID-SEPARATOR.

950,331.   Specification of Letters Patent.   Patented Feb. 22, 1910.

Application filed June 19, 1908. Serial No. 439,301.

*To all whom it may concern:*

Be it known that I, MATTHEW L. HOYT, a citizen of the United States, residing at Little Falls, in the county of Herkimer and State of New York, have invented a new and useful Improvement in Centrifugal Liquid-Separators, of which the following is a specification.

This invention relates to liners or division contrivances for centrifugal liquid or cream separators which are provided with upright division plates arranged to intersect radial lines of the bowl. Separators of this kind are usually provided with a central feed tube through which the milk to be separated is conducted to the bottom of the bowl and outwardly beyond the cream wall or zone. These tubes are objectionable for several reasons, among them that they interfere somewhat with the free movement of the cream upwardly through the bowl, particularly when skimming cold milk, in which case the cream often packs against the tube and is not discharged as freely and completely as is desired.

The object of this invention is to construct the liner in such manner that a feed tube mounted in the bowl is rendered unnecessary, while the incoming full milk is prevented from interfering with the separated cream or flowing into the cream wall or zone and is also gradually speeded up or caused to rotate with the bowl and the liquid contained therein as the milk flows outwardly over the bottom of the bowl.

Figure 1:
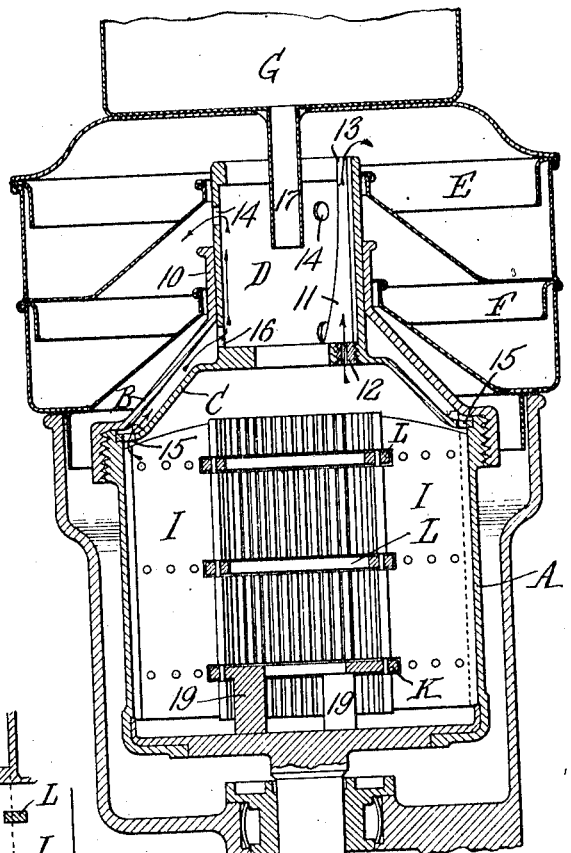
Figure 3:
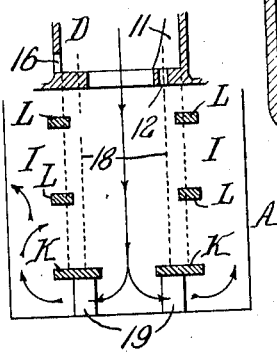
Figure 2:
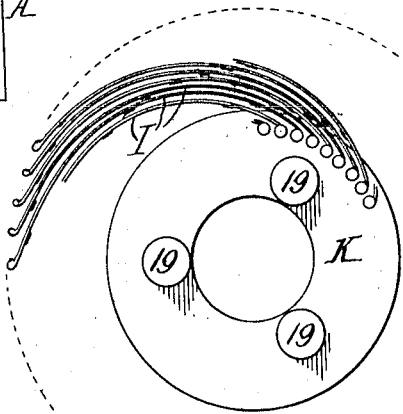
Figure 4:
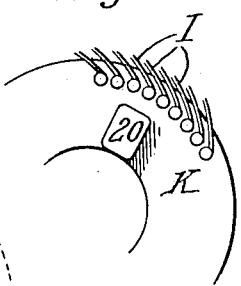

In the accompanying drawings: Figure 1 is a sectional elevation of a centrifugal liquid separator provided with a liner embodying this invention. Fig. 2 is a fragmentary bottom plan view of the liner, on an enlarged scale. Fig. 3 is a diagrammatic sectional elevation of the bowl and liner. Fig. 4 is a fragmentary bottom plan view of the liner showing a slightly modified construction of the feet of the liner.

Like reference characters refer to like parts in the several figures.

A represents the separating bowl which may be of any suitable construction and provided with discharge devices for the cream and skim-milk of any suitable character. The bowl shown in the drawings is provided with discharge devices substantially like those which are represented in Patent No. 741,342, Oct. 13, 1903, and which comprise a tapering cover B having a cylindrical neck 10, a skimming shield C, arranged underneath the cover and provided with a cylindrical neck D having an upwardly extending cream channel 11 provided at its lower end with a screw 12 for regulating the distance of the cream discharge from the axis of the bowl and at its upper end an outlet 13 for the cream. The neck D of the shield is further provided outside of the cream channel and above the neck 10 of the cover with discharge openings 14 for the skim-milk to which the skim-milk passes through the space between the cover and the shield and through openings 15 at the base of the shield and openings 16 at the base of the neck D.

E represents the pan or receptacle which receives the cream from the outlet 13, and F the pan or receptacle which receives the skim-milk from the outlets 15. G represents the feed cup or well arranged above these pans and provided with a central discharge pipe 17 which extends a short distance into the neck of the shield and from which the milk drops upon the bottom of the bowl.

The liner or division contrivance arranged within the bowl comprises upright curved blades I and horizontal connecting rings K L to which the blades are movably or pivotally connected at their inner ends and from which the blades extend outwardly toward the peripheral wall of the bowl. The upper rings L are comparatively narrow and of such diameter that they are located with their inner edge at a short distance outwardly beyond the innermost point or surface of the cream wall or zone which is fixed by the cream screw 12, usually provided with a passage or notch in a well known manner through which the cream flows. In the diagram, Fig. 3, the innermost surface or centrifugal level of the cream wall or zone is indicated by the dotted lines 18. The lower connecting ring K is wider than the upper rings and extends inwardly beyond the innermost surface or centrifugal level of the cream wall or zone so that it prevents the inflow of new milk into the cream wall from the space below this lower ring. The lower ring K is arranged above the bottom of the bowl and provided on its underside with projections, ribs or wings which may be round feet 19, as represented in Fig. 2, or flat-sided feet 20, as represented in Fig. 4, and which preferably serve at the same time for supporting the liner on the bottom of the bowl.

The milk fed into the bowl falls from the feed cup directly upon the bottom of the bowl, spreads out on the bottom and is driven outwardly over the same by centrifugal force. The ribs, wings or feet of the liner, which rotate with the bowl, seize the milk as it flows outwardly between the bottom of the bowl and the lower ring K, and compel the milk to assume a rotary motion, thereby gradually speeding the milk up before it passes outwardly beyond the lower ring and commingles with the body of milk contained in and rotating with the bowl. This prevents the incoming new milk from interfering with or retarding the rotating body of milk which has already assumed the velocity of the bowl and begun to separate into its constituent liquids under the action of centrifugal force. The lower ring acts as a shield in protecting the lower portion of the cream wall against disturbance by the incoming new milk which strikes the bottom of the bowl and spreads on the same, and in preventing the new milk from entering the cream wall directly and flowing out with the cream without having undergone the separating process.

The usual rotary feed tube in the bowl is avoided by this construction and the difficulties arising from its presence are avoided, the bowl is rendered lighter, and the operation of cleaning the bowl is simplified. As the accumulation of packed cream around the usual feed tube tends to retard the separation, the absence of such a tube improves the separation to that extent.

I claim as my invention:

1. In a centrifugal liquid separator, the combination with a separating bowl provided at its top with discharge devices for the separated liquids and having means for feeding the liquid to be separated freely and directly upon the bottom of the bowl, of a removable liner arranged within the bowl and comprising upright division plates which intersect radial lines of the bowl and an annular shield connected with the lower portions of said blades adjacent to the inner edges thereof and extending inwardly beyond said blades to a point nearer the axis of the bowl than said outlets of the bowl, substantially as set forth.

2. The combination with a centrifugal separating bowl provided at its top with discharge devices for the separated liquids and having means for feeding the liquid to be separated freely and directly upon the bottom of the bowl, of a liner arranged within the bowl and comprising upright blades which extend across the liquid space of the bowl and an annular shield having its outer edge arranged adjacent to the inner ends of said blades and extending inwardly to a point nearer the axis of the bowl than said outlets, said shield being provided on its under side with projections which engage the incoming liquid and cause the same to rotate, substantially as set forth.

3. The combination with a centrifugal separating bowl provided at its top with discharge devices for the separated liquids and having means for feeding the liquid to be separated freely and directly upon the bottom of the bowl, of a liner arranged within the bowl and comprising upright blades which extend across the liquid space of the bowl and an annular shield to which the inner ends of said blades are movably connected and which extends inwardly to a point nearer the axis of the bowl than said outlets, said shield being provided on its under side with projections which engage the incoming liquid and cause the same to rotate, substantially as set forth.

4. The combination with a centrifugal separating bowl provided at its top with discharge devices for the separated liquids and having means for feeding the liquid to be separated freely and directly upon the bottom of the bowl, of a liner arranged within the bowl and comprising upright blades which extend across the liquid space of the bowl and an annular shield to which the inner ends of the blades are pivoted and which extends inwardly to a point nearer the axis of the bowl than said outlets, said shield being provided on its under side with feet which rest upon the bottom of the bowl and support the liner thereon and which also serve to cause the incoming milk to rotate, substantially as set forth.

Witness my hand in the presence of two subscribing witnesses.

MATTHEW L. HOYT.

Witnesses:
HARVEY FELDMEIER,
SHIELDS BURR.